United States Patent
Wallingford et al.

(10) Patent No.: US 11,776,108 B2
(45) Date of Patent: Oct. 3, 2023

(54) DEEP LEARNING BASED DEFECT DETECTION

(71) Applicant: KLA Corporation, Milpitas, CA (US)

(72) Inventors: Richard Wallingford, Ames, IA (US); Ge Cong, Pleasanton, CA (US); Sangbong Park, Union City, CA (US)

(73) Assignee: KLA Corp., Milpitas, CA (US)

( * ) Notice: Subject to any disclaimer, the term of this patent is extended or adjusted under 35 U.S.C. 154(b) by 358 days.

(21) Appl. No.: 17/155,037

(22) Filed: Jan. 21, 2021

(65) Prior Publication Data

US 2022/0044391 A1    Feb. 10, 2022

Related U.S. Application Data

(60) Provisional application No. 63/061,600, filed on Aug. 5, 2020.

(51) Int. Cl.
*G06T 7/00*        (2017.01)
*G06T 7/70*        (2017.01)
(Continued)

(52) U.S. Cl.
CPC .......... *G06T 7/0006* (2013.01); *G06F 18/214* (2023.01); *G06N 3/045* (2023.01); *G06N 3/08* (2013.01); *G06T 7/70* (2017.01); *G06T 11/00* (2013.01); *G06T 2207/10061* (2013.01); *G06T 2207/20081* (2013.01); *G06T 2207/30148* (2013.01)

(58) Field of Classification Search
CPC .......... G06T 7/0006; G06T 7/00; G06T 7/70; G06T 11/00; G06T 2207/30148; G06T 2207/20084; G06T 2207/0061; G06N 3/045; G06N 3/08; G06N 3/04; G06N 3/0454; G06F 18/214; G06K 9/62; G06K 9/6256

See application file for complete search history.

(56) References Cited

U.S. PATENT DOCUMENTS 7,570,796 B2   8/2009   Zafar et al.
7,676,077 B2   3/2010   Kulkarni et al.
(Continued)

OTHER PUBLICATIONS

International Search Report and Written Opinion for PCT/US2021/043347 dated Nov. 10, 2021.

(Continued)

*Primary Examiner* — Tuan H Nguyen
(74) *Attorney, Agent, or Firm* — Ann Marie Mewherter

(57) ABSTRACT

Methods and systems for detecting defects on a specimen are provided. One system includes one or more computer systems and one or more components executed by the one or more computer systems. The component(s) include a deep learning model configured for, for a location on a specimen, generating a gray scale simulated design data image from a high resolution image generated at the location by a high resolution imaging system. The computer system(s) are configured for generating a simulated binary design data image for the location from the gray scale simulated design data image. The computer system(s) are also configured for detecting defects at the location on the specimen by subtracting design data for the location from the simulated binary design data image.

22 Claims, 5 Drawing Sheets

(51) Int. Cl.
  *G06T 11/00* (2006.01)
  *G06N 3/08* (2023.01)
  *G06F 18/214* (2023.01)
  *G06N 3/045* (2023.01)

(56) References Cited

U.S. PATENT DOCUMENTS

| | | | |
|---|---|---|---|
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,915,625 B2 * | 3/2018 | Gao | G01N 21/9501 |
| 11,320,357 B2 * | 5/2022 | Duke | G06T 7/30 |
| 2012/0078591 A1 | 3/2012 | Sims, Jr. | |
| 2017/0140524 A1 | 5/2017 | Karsenti et al. | |
| 2017/0148226 A1 | 5/2017 | Zhang et al. | |
| 2017/0191948 A1 | 7/2017 | Gao et al. | |
| 2017/0193400 A1 | 7/2017 | Bhaskar et al. | |
| 2017/0193680 A1 | 7/2017 | Zhang et al. | |
| 2017/0194126 A1 | 7/2017 | Bhaskar et al. | |
| 2017/0200260 A1 | 7/2017 | Bhaskar et al. | |
| 2017/0200264 A1 | 7/2017 | Park et al. | |
| 2017/0200265 A1 | 7/2017 | Bhaskar et al. | |
| 2017/0345140 A1 | 11/2017 | Zhang et al. | |
| 2019/0073566 A1 | 3/2019 | Brauer | |
| 2019/0073568 A1 | 3/2019 | He et al. | |
| 2019/0294923 A1 | 9/2019 | Riley et al. | |
| 2019/0303717 A1 | 10/2019 | Bhaskar et al. | |
| 2020/0098101 A1 | 3/2020 | Pandey et al. | |
| 2020/0234428 A1 | 7/2020 | George et al. | |

OTHER PUBLICATIONS

Goodfellow et al., "Generative Adversarial Nets," arXiv:1406.2661v1, Jun. 10, 2014, pp. 1-9.
Hand et al., "Principles of Data Mining (Adaptive Computation and Machine Learning)," MIT Press, Aug. 1, 2001, 578 pages.
Isola et al., "Image-to-Image Translation with Conditional Adversarial Networks," arXiv:1611.07004v2, Nov. 22, 2017, 17 pages.
Jebara, "Discriminative, Generative, and Imitative Learning," MIT Thesis, Feb. 2002, 212 pages.
Sugiyama, "Introduction to Statistical Machine Learning," Morgan Kaufmann, Oct. 9, 2015, 534 pages.

* cited by examiner

DEEP LEARNING BASED DEFECT DETECTION

BACKGROUND OF THE INVENTION

1. Field of the Invention

The present invention generally relates to methods and systems for detecting defects on a specimen.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Inspection results are typically reviewed using scanning electron microscopy (SEM) images for defect classification. One of the key steps of this operation is defect detection within the SEM image. Currently used methods for detecting defects in SEM review images uses the SEM image itself and possibly a reference SEM image. Design images can also be included to augment the detection and improve performance when machine learning algorithms are used. Defect detection is often difficult due to factors such as image noise and subtleness of the defective pattern relative to the normal pattern. One disadvantage of currently used methods, therefore, includes problems resulting from image noise and pattern noise that can result in missed defects or false positives. SEM reference image subtraction can help but comes at a cost of additional scanning time.

Accordingly, it would be advantageous to develop systems and methods for detecting defects on a specimen that do not have one or more of the disadvantages described above.

SUMMARY OF THE INVENTION

The following description of various embodiments is not to be construed in any way as limiting the subject matter of the appended claims.

One embodiment relates to a system configured to detect defects on a specimen. The system includes one or more computer systems and one or more components executed by the one or more computer systems. The one or more components include a deep learning model configured for, for a location on a specimen, generating a gray scale simulated design data image from a high resolution image generated at the location, and the high resolution image is generated at the location by a high resolution imaging system. The one or more computer systems are configured for generating a simulated binary design data image for the location from the gray scale simulated design data image. The one or more computer systems are also configured for detecting defects at the location on the specimen by subtracting design data for the location from the simulated binary design data image. The system may be further configured as described herein.

Another embodiment relates to a computer-implemented method for detecting defects on a specimen. The method includes, for a location on a specimen, generating a gray scale simulated design data image from a high resolution image generated at the location. The high resolution image is generated at the location by a high resolution imaging system. Generating the gray scale simulated design data image is performed by a deep learning model included in one or more components executed by one or more computer systems. The method also includes generating a simulated binary design data image for the location from the gray scale simulated design data image. In addition, the method includes detecting defects at the location on the specimen by subtracting design data for the location from the simulated binary design data image. Generating the simulated binary design data image and detecting the defects are performed by the one or more computer systems.

Each of the steps of the method described above may be further performed as described herein. In addition, the embodiment of the method described above may include any other step(s) of any other method(s) described herein. The method described above may be performed by any of the systems described herein.

Another embodiment relates to a non-transitory computer-readable medium storing program instructions executable on one or more computer systems for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
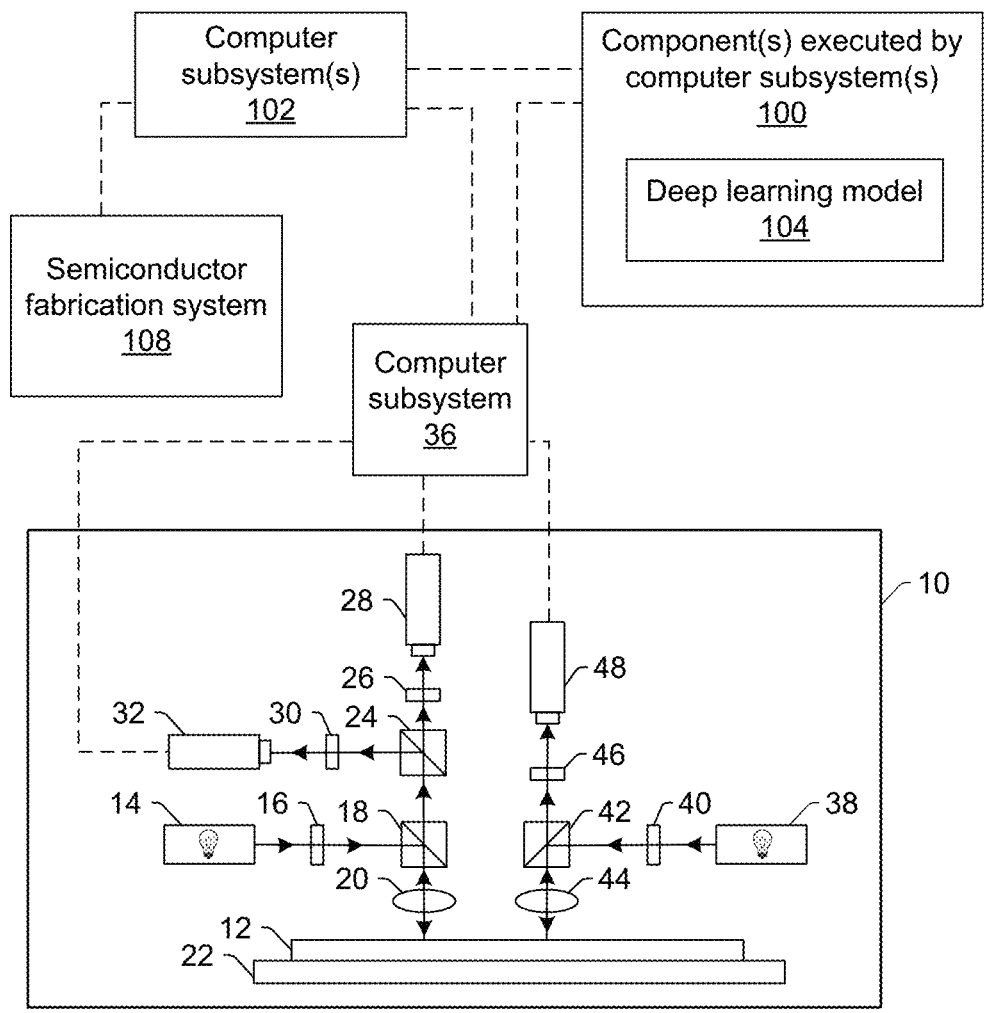
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on the specimen (e.g., grain in metal lines on the specimen, signals from underlaying layers or materials on the specimen, line edge roughness (LER), relatively small critical dimension (CD) variation in patterned features, thickness variations, etc.) and/or due to marginalities in the imaging system itself or its configuration used for imaging.

The term "defects of interest (DOIs)" as used herein can be defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a specimen. In some embodiments, the specimen is a wafer. The wafer may include any wafer known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

One embodiment of such a system is shown in FIG. 1. The system includes one or more computer subsystems (e.g., computer subsystems 36 and 102) and one or more components 100 executed by the one or more computer subsystems. The one or more components include deep learning (DL) model 104, which is configured as described further herein. In the embodiment shown in FIG. 1, the system includes tool 10 that may include a high resolution imaging subsystem and/or a low resolution imaging subsystem. In some embodiments, the tool is configured as an optical (light-based) inspection tool. However, the tool may be configured as another type of inspection or other imaging tool described further herein.

The term "low resolution," as used herein, is generally defined as a resolution at which all of the patterned features on the specimen cannot be resolved. For example, some of the patterned features on the specimen may be resolved at a "low" resolution if their size is large enough to render them resolvable. However, the term "low resolution" as used herein refers to a resolution that does not render all patterned features on the specimens described herein resolvable. In this manner, a "low resolution," as that term is used herein, cannot be used to generate information about patterned features on the specimen that is sufficient for applications such as defect review, which may include defect classification and/or verification, and metrology. In addition, a "low resolution" imaging system, subsystem, tool, etc. as those terms are used herein generally refers to an imaging system, subsystem, tool, etc. that has a relatively low resolution (e.g., lower than defect review and/or metrology systems) in order to have relatively fast throughput. In this manner, a "low resolution image" may also be commonly referred to as a high throughput or HT image. Different kinds of imaging systems may be configured for a low resolution. For example, in order to generate images at higher throughput, the e/p and the number of frames of a scanning electron microscope (SEM) may be lowered than the highest resolution it is capable of thereby resulting in lower quality SEM images.

The "low resolution" may also be "low resolution" in that it is lower than a "high resolution" described herein. A "high resolution" as that term is used herein can be generally defined as a resolution at which all patterned features of the specimen can be resolved with relatively high accuracy. In this manner, all of the patterned features on the specimen can be resolved at the high resolution regardless of their size. As such, a "high resolution," as that term is used herein, can be used to generate information about patterned features of the specimen that is sufficient for use in applications such as defect review, which may include defect classification and/or verification, and metrology. In addition, a "high resolution" as that term is used herein refers to a resolution that is generally not used by inspection systems during routine operation, which are configured to sacrifice resolution capability for increased throughput. A "high resolution image" may also be referred to in the art as a "high sensitivity image" which is another term for a "high quality image." Different kinds of imaging systems may be configured for a high resolution. For example, to generate high quality images, the e/p, frames, etc. of a SEM may be increased, which generates good quality SEM images but lowers the throughput considerably. These images are then "high sensitivity" images in that they can be used for high sensitivity defect detection.

The high and/or low resolution imaging subsystems include at least an energy source and a detector. The energy source is configured to generate energy that is directed to a specimen. The detector is configured to detect energy from the specimen and to generate output (e.g., images) responsive to the detected energy. Various configurations of the high and/or low resolution imaging subsystems are described further herein.

In general, the high and low resolution imaging subsystems may share some image forming elements of the tool or none of the image forming elements of the tool. For example, the high and low resolution imaging subsystems may share the same energy source and detector, and one or more parameters of the energy source, detector, and/or other image forming elements of the tool may be altered depending on if the high resolution imaging subsystem or the low resolution imaging subsystem is generating images of the specimen. In another example, the high and low resolution imaging subsystems may share some image forming elements of the tool such as the energy source and may have other non-shared image forming elements such as separate detectors. In a further example, the high and low resolution imaging subsystems may share no common image forming elements. In one such example, the high and low resolution imaging subsystems may each have their own energy source, detector(s), and any other image forming elements that are not used or shared by the other imaging subsystem.

In the embodiment of the system shown in FIG. 1, the high resolution imaging subsystem includes an illumination subsystem configured to direct light to specimen 12. The illumination subsystem includes at least one light source. For example, as shown in FIG. 1, the illumination subsystem includes light source 14. The illumination subsystem is configured to direct the light to the specimen at one or more angles of incidence, which may include one or more oblique angles and/or one or more normal angles. For example, as shown in FIG. 1, light from light source 14 is directed through optical element 16 to beam splitter 18. Beam splitter 18 directs the light from optical element 16 to lens 20, which focuses the light to specimen 12 at a normal angle of incidence. The angle of incidence may include any suitable angle of incidence, which may vary depending on, for instance, characteristics of the specimen.

The illumination subsystem may be configured to direct the light to the specimen at different angles of incidence at different times. For example, the tool may be configured to alter one or more characteristics of one or more elements of the illumination subsystem such that the light can be directed to the specimen at an angle of incidence that is different than that shown in FIG. 1. In one such example, the tool may be configured to use one or more apertures (not shown) to control the angle(s) at which light is directed from lens 20 to the specimen.

In one embodiment, light source 14 may include a broadband light source such as a broadband plasma (BBP) light source. In this manner, the light generated by the light source and directed to the specimen may include broadband light. However, the light source may include any other suitable light source such as a laser, which may include any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from beam splitter 18 may be focused onto specimen 12 by lens 20. Although lens 20 is shown in FIG. 1 as a single refractive optical element, it is to be understood that, in practice, lens 20 may include a number of refractive and/or reflective optical elements that in combination focus the light to the specimen. The illumination subsystem of the high resolution imaging subsystem may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the tool may be configured to alter one or more of the elements of the illumination subsystem based on the type of illumination to be used for imaging.

Although the high resolution imaging subsystem is described above as including one light source and one illumination channel in its illumination subsystem, the illumination subsystem may include more than one illumination channel, one of the illumination channels may include light source 14, optical element 16, and lens 20 as shown in FIG. 1 and another of the illumination channels (not shown) may include similar elements, which may be configured differently or the same, or may include at least a light source and possibly one or more other components such as those described further herein. If the light from different illumination channels is directed to the specimen at the same time, one or more characteristics (e.g., wavelength, polarization, etc.) of the light directed to the specimen by the different illumination channels may be different such that light resulting from illumination of the specimen by the different illumination channels can be discriminated from each other at the detector(s).

In another instance, the illumination subsystem may include only one light source (e.g., source 14 shown in FIG. 1) and light from the light source may be separated into different paths (e.g., based on wavelength, polarization, etc.) by one or more optical elements (not shown) of the illumination subsystem. Light in each of the different paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 16 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

The tool may also include a scanning subsystem configured to cause the light to be scanned over the specimen. For example, the tool may include stage 22 on which specimen 12 is disposed during imaging. The scanning subsystem may include any suitable mechanical and/or robotic assembly (that includes stage 22) that can be configured to move the specimen such that the light can be scanned over the specimen. In addition, or alternatively, the tool may be configured such that one or more optical elements of the high resolution imaging subsystem perform some scanning of the light over the specimen. The light may be scanned over the specimen in any suitable fashion such as in a serpentine-like path or in a spiral path.

The high resolution imaging subsystem further includes one or more detection channels. At least one of the one or more detection channels includes a detector configured to detect light from the specimen due to illumination of the specimen by the illumination subsystem and to generate output responsive to the detected light. For example, the high resolution imaging subsystem shown in FIG. 1 includes a detection channel formed by lens 20, element 26, and detector 28. Although the high resolution imaging subsystem is described herein as including a common lens used for both illumination and collection/detection, the illumination subsystem and the detection channel may include separate lenses (not shown) for focusing in the case of illumination and collection in the case of detection. The detection channel may be configured to collect and detect light at different angles of collection. For example, the angles of light that are collected and detected by the detection channel may be selected and/or altered using one or more apertures (not shown) that are positioned in a path of the light from the specimen. The light from the specimen that is detected by the detection channel of the high resolution imaging subsystem may include specularly reflected light and/or scattered light. In this manner, the high resolution imaging subsystem shown in FIG. 1 may be configured for dark field (DF) and/or bright field (BF) imaging.

Element 26 may be a spectral filter, an aperture, or any other suitable element or combination of elements that can be used to control the light that is detected by detector 28. Detector 28 may include any suitable detector known in the art such as a photo-multiplier tube (PMT), charge coupled device (CCD), and time delay integration (TDI) camera. The detector may also include a non-imaging detector or imaging detector. If the detector is a non-imaging detector, the detector may be configured to detect certain characteristics of the light such as intensity but may not be configured to detect such characteristics as a function of position within the imaging plane. As such, the output that is generated by the detector may be signals or data, but not image signals or image data. A computer subsystem such as computer subsystem 36 may be configured to generate images of the specimen from the non-imaging output of the detector. However, the detector may be configured as an imaging detector that is configured to generate imaging signals or image data. Therefore, the high resolution imaging subsystem may be configured to generate the images described herein in a number of ways.

The high resolution imaging subsystem may also include another detection channel. For example, light from the specimen that is collected by lens 20 may be directed through beam splitter 18 to beam splitter 24, which may transmit a portion of the light to optical element 26 and reflect another portion of the light to optical element 30. Optical element 30 may be a spectral filter, an aperture, or any other suitable element or combination of elements that can be used to control the light that is detected by detector 32. Detector 32 may include any of the detectors described above. The different detection channels of the high resolution imaging subsystem may be configured to generate different images of the specimen (e.g., images of the specimen generated with light having different characteristics such as polarization, wavelength, etc. or some combination thereof).

In a different embodiment, the detection channel formed by lens 20, optical element 30, and detector 32 may be part of the low resolution imaging subsystem of the tool. In this case, the low resolution imaging subsystem may include the same illumination subsystem as the high resolution imaging subsystem, which is described in detail above (e.g., the illumination subsystem that includes light source 14, optical element 16, and lens 20). The high and low resolution imaging subsystems may therefore share a common illumination subsystem. The high and low resolution imaging subsystems may however include different detection channels, each of which is configured to detect light from the specimen due to illumination by the shared illumination subsystem. In this manner, the high resolution detection channel may include lens 20, optical element 26, and detector 28, and the low resolution detection channel may include lens 20, optical element 30, and detector 32. In this manner, the high and low resolution detection channels may share a common optical element (lens 20) but also have non-shared optical elements.

The detection channels of the high and low resolution imaging subsystems may be configured to generate high and low resolution specimen images, respectively, even though they share an illumination subsystem. For example, optical elements 26 and 30 may be differently configured apertures and/or spectral filters that control the portions of the light that are detected by detectors 28 and 32, respectively, to thereby control the resolution of the images generated by detectors 28 and 32, respectively. In a different example, detector 28 of the high resolution imaging subsystem may be selected to have a higher resolution than detector 32. The detection channels may be configured in any other suitable way to have different resolution capabilities.

In another embodiment, the high and low resolution imaging subsystems may share all of the same image forming elements. For example, both the high and low resolution imaging subsystems may share the illumination subsystem formed by light source 14, optical element 16, and lens 20. The high and low resolution imaging subsystems may also share the same detection channel or channels (e.g., one formed by lens 20, optical element 26, and detector 28 and/or another formed by lens 20, optical element 30, and detector 32). In such an embodiment, one or more parameters or characteristics of any of these image forming elements may be altered depending on whether high or low resolution images are being generated for the specimen. For example, a numerical aperture (NA) of lens 20 may be altered depending on whether high or low resolution images are being formed of the specimen.

In a further embodiment, the high and low resolution imaging subsystems may not share any image forming elements. For example, the high resolution imaging subsystem may include the image forming elements described above, which may not be shared by the low resolution imaging subsystem. Instead, the low resolution imaging subsystem may include its own illumination and detection subsystems. In one such example, as shown in FIG. 1, the low resolution imaging subsystem may include an illumination subsystem that includes light source 38, optical element 40, and lens 44. Light from light source 38 passes through optical element 40 and is reflected by beam splitter 42 to lens 44, which directs the light to specimen 12. Each of these image forming elements may be configured as described above. The illumination subsystem of the low resolution imaging subsystem may be further configured as described herein. Specimen 12 may be disposed on stage 22, which may be configured as described above to cause scanning of the light over the specimen during imaging. In this manner, even if the high and low resolution imaging subsystems do not share any image forming elements, they may share other elements of the tool such as the stage, scanning subsystem, power source (not shown), housing (not shown), etc.

The low resolution imaging subsystem may also include a detection channel formed by lens 44, optical element 46, and detector 48. Light from the specimen due to illumination by the illumination subsystem may be collected by lens 44 and directed through beam splitter 42, which transmits the light to optical element 46. Light that passes through optical element 46 is then detected by detector 48. Each of these image forming elements may be further configured as described above. The detection channel and/or detection subsystem of the low resolution imaging subsystem may be further configured as described herein.

It is noted that FIG. 1 is provided herein to generally illustrate configurations of high and low resolution imaging subsystems that may be included in the tool or that may generate images that are used by the systems or methods described herein. The configurations of the high and low resolution imaging subsystems described herein may be altered to optimize the performance of the high and low resolution imaging subsystems as is normally performed when designing a commercial tool. In addition, the systems described herein may be implemented using an existing system (e.g., by adding functionality described herein to an existing system) such as the Altair and 29xx/39xx series of tools that are commercially available from KLA, Milpitas, Calif. For some such systems, the embodiments described herein may be provided as optional functionality of the system (e.g., in addition to other functionality of the system). Alternatively, the tool described herein may be designed "from scratch" to provide a completely new inspection or other tool.

The system also includes one or more computer subsystems configured for acquiring the images of the specimen generated by the high and low resolution imaging subsystems. For example, computer subsystem 36 may be coupled to the detectors of the tool in any suitable manner (e.g., via one or more transmission media, which may include "wired" and/or "wireless" transmission media) such that the computer subsystem can receive the output or images generated by the detectors for the specimen. Computer subsystem 36 may be configured to perform a number of functions described further herein using the output or images generated by the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the high and low resolution imaging subsystems are described above as being optical or light-based imaging subsystems, the high and low resolution imaging subsystems may also or alternatively include electron beam imaging subsystem(s) configured to generate electron beam images of the specimen. In one such embodiment, the high resolution imaging system is configured as an electron beam imaging system. The electron beam imaging system may be configured to direct electrons to or scan electrons over the specimen and to detect electrons from the specimen. In one such embodiment shown in FIG. 1a, the electron beam imaging system includes electron column 122 coupled to computer subsystem 124.

Figure 1A:
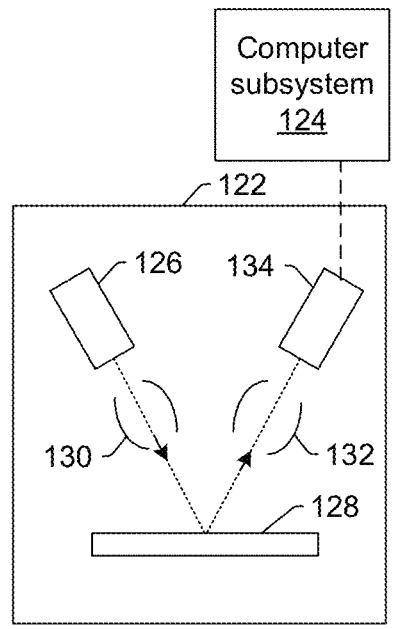

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are returned from the specimen at another oblique angle, it is to be understood that the electron beam may be directed to and detected from the specimen at any suitable angles. In addition, the electron beam imaging system may be configured to use multiple modes to generate images of the specimen as described further herein (e.g., with different illumination angles, collection angles, etc.). The multiple modes of the electron beam imaging system may be different in any image generation parameters. The electron column shown in FIG. 1a may also be configured to function as high and low resolution imaging subsystems in any suitable manner known in the art (e.g., by changing one or more parameters or characteristics of one or more elements included in the electron column so that high or low resolution images can be generated for the specimen).

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. A system that includes the electron beam imaging system shown in FIG. 1a may be further configured as described herein.

It is noted that FIG. 1a is provided herein to generally illustrate a configuration of an electron beam imaging system that may be included in the embodiments described herein. As with the optical imaging subsystems described above, the electron beam imaging system configuration described herein may be altered to optimize the performance of the imaging system as is normally performed when designing a commercial imaging system. In addition, the systems described herein may be implemented using an existing system (e.g., by adding functionality described herein to an existing system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging systems are described above as being light or electron beam imaging systems, the imaging systems may be ion beam imaging systems. Such an imaging system may be configured as shown in FIG. 1a except that the electron beam source may be replaced with any suitable ion beam source known in the art. In addition, the imaging system may be any other suitable ion beam-based imaging system such as those included in commercially available focused ion beam (FIB) systems, helium ion microscopy (HIM) systems, and secondary ion mass spectroscopy (SIMS) systems.

Although the imaging systems are described above as including high and low resolution imaging subsystems that are either optical, electron beam, or charged particle beam based, the high and low resolution imaging systems do not necessarily have to use the same type of energy. For example, the high resolution imaging system may be an electron beam type imaging system while the low resolution imaging system may be a light-based optical type imaging system. Imaging systems that use different types of energy may be combined into a single tool in any suitable manner known in the art.

As noted above, the imaging systems may be configured for directing energy (e.g., light, electrons) to and/or scanning energy over a physical version of the specimen thereby generating actual images for the physical version of the specimen. In this manner, the imaging systems may be configured as "actual" imaging systems, rather than "virtual" systems. However, a storage medium (not shown) and computer subsystem(s) 102 shown in FIG. 1 may be configured as a "virtual" system. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

As further noted above, the imaging systems may be configured to generate images of the specimen with multiple modes. In general, a "mode" can be defined by the values of parameters of an imaging system used for generating images of a specimen or the output used to generate images of the specimen. Therefore, modes that are different may be different in the values for at least one of the imaging parameters of the imaging system. For example, in an optical imaging system, different modes may use different wavelength(s) of light for illumination. The modes may be different in the illumination wavelength as described further herein (e.g., by using different light sources, different spectral filters, etc.) for different modes. Both the high and low resolution imaging systems may be capable of generating output or images for the specimen with different modes.

In general, as is described further herein, the embodiments may be configured for defect detection using simulated design data images (e.g., database images) generated from high resolution images (e.g., SEM review images) and defect information from an inspection (e.g., from an optical inspector). The deep learning (DL) model is configured for, for a location on a specimen, generating a gray scale simulated design data image from a high resolution image generated at the location. The high resolution image is generated at the location by a high resolution imaging system. In this manner, the embodiments described herein are configured for image-to-image transformation to render a simulated design or database image directly from a defective high resolution image (e.g., a defective SEM image).

In some embodiments, the location is selected from locations on the specimen at which one or more defects were previously detected. For example, the embodiments described herein may be used for defect review in which defects that were previously detected on a specimen may actually be re-detected (rather than simply detected) using high resolution images generated by a defect review system. In particular, the term "inspection" generally refers to the process in which an area on a specimen is scanned to search for any defects that may be present but whose presence or absence has not been queried prior to inspection. Inspection is therefore not performed based on any information about any defects that have previously been detected on the layer of the specimen being inspected. In contrast, "defect review" as that term is commonly used in the art refers to the process in which discrete locations on a specimen at which defects have been detected are revisited to gather more information (e.g., a higher resolution image) so that the presence of the defects can be verified and so that the additional information can be used to determine additional information about the defects, if re-detected, such as defect type, defect characteristics, etc. Since the embodiments described herein may be performed for both defect detection (for a location at which no inspection has been performed previously) or re-detection (for a location at which a defect was previously detected), the detecting or re-detecting is simply referred to as detecting.

In this manner, the steps described herein may be separately and independently performed for one or more locations on the specimen at which defects were detected (e.g., by inspection, another defect review process, etc.). However, the locations for which the steps described herein may also or alternatively be performed may be locations at which no defects were previously detected and/or at which the presence of defects is unknown despite an inspection having been performed on the specimen or because inspection has not yet been performed on the specimen. In this manner, the embodiments described herein may be used for inspection-type applications in which at least a portion of a specimen (a not previously inspected specimen) is examined for defects and/or to search for defects in locations having otherwise unknown defectivity. In such embodiments, the high resolution images that are used for the steps described herein may be high resolution images generated by a high resolution inspection system (such as an electron beam system configured for high resolution inspection of a specimen or another system that is used in a high resolution mode for inspection). In any case, although some of the steps and/or embodiments are described herein with respect to a location, the steps described herein may be separately and independently performed for different locations on the specimen.

The location or locations for which the steps described herein is/are performed may be selected from all of the defect locations in any suitable manner. For example, the steps described herein may be performed for all of the locations at which defects were detected. However, such a method may be impractical due to the number of defects typically detected on a specimen. In this manner, the location(s) for which the steps described herein are performed may be selected to be fewer (and usually substantially fewer) than all of the locations at which defects were detected. The defect location(s) may selected (i.e., sampled) in any suitable manner (e.g., randomly, based on one or more characteristics of the defects, based on the defect locations, based on a predetermined distribution of the locations as a function of characteristics of the defects, the defect locations, or any other information determined by inspection). The embodiments described herein may perform such defect location selection. However, the embodiments described herein may receive the selected defect location(s) from another method or system that selected the defect location(s) such as an inspection tool not included in the system.

The location or locations for which the steps described herein is/are performed may also be determined by the embodiments described herein and/or received from another system or method. For example, the locations on the specimen at which defects have been detected (and possibly any information generated for the defects and/or the locations) may be acquired by the embodiments described herein from another method or system that determined the locations (e.g., by inspection or by generating a sampling plan for the embodiments described herein) or a storage medium in which the locations have been stored by another method or system. The embodiments described herein may however determine the locations (e.g., if the embodiments described herein perform inspection of the specimen thereby identifying locations of defects detected on the specimen or if the embodiments described herein generate a sampling plan for the location(s) on the specimen at which the step(s) described herein are performed).

In one such embodiment, the one or more defects were detected at the locations on the specimen by a light-based inspection system. For example, the location(s) for which the step(s) described herein are performed may be location(s) of defects detected by light-based inspection of a specimen. The embodiments described herein may or may not be configured to perform such inspection. For example, the light-based tool shown in FIG. 1 and described above may be used in an inspection mode (e.g., one or more modes performed using the low resolution imaging subsystem) in which the light-based tool scans light over the specimen while detecting light from the specimen. The computer system(s) shown in FIG. 1 may use output responsive to the detected light to detect defects on the specimen. In one such example, the computer system(s) may apply a defect detection method or algorithm to the output. In the simplest version of a suitable defect detection method or algorithm, the output may be compared to a defect detection threshold. Output that is above the threshold may be designated as defects (or potential defects), and output that is not above the threshold may not be designated as defects. Of course, the computer system(s) may detect the defects on the wafer in any other suitable manner using the output generated by any of the tools described herein.

In another such embodiment, the one or more defects were detected at the locations on the specimen by the high resolution imaging system. For example, the high resolution imaging system may be used for an inspection-type application in which due to the much lower throughput of high resolution imaging systems compared to those typically used for inspection, a much smaller area on the specimen is inspected for defects and/or inspection is performed at only discrete areas on the specimen. In this manner, the high resolution imaging system may be used for scanning areas in which the defectivity is unknown and determining if defects are located in those areas. In this manner, inspection of the specimen may be performed with a high resolution imaging system in a high resolution imaging mode. However, as described further above, the imaging systems described herein may be configured for multiple modes. For example, both the light and electron beam tools described herein may be capable of multiple mode imaging, one of the modes may be a low resolution mode and another mode may be a high resolution mode. In this manner, the high resolution imaging system may perform an inspection like function on the specimen using the low resolution mode and may then use the high resolution mode to acquire high resolution images for the selected location(s) for which the steps described herein will be performed.

In some embodiments, the high resolution imaging system is configured as an electron beam imaging system. For example, an electron beam imaging system such as that shown in FIG. 1a and described above may generate the high resolution image(s) at the location(s) on the specimen for which the steps described herein will be performed.

In some embodiments, the system includes the high resolution imaging system. For example, as shown in FIGS. 1 and 1a and described above, the one or more computer systems of the system may be coupled to a high resolution imaging system that is included in the system. In this manner, the steps described herein may be performed by the computer system(s) on tool (e.g., on the inspection tool that detects the defects on the specimen in an inspection process and/or on the defect review tool that re-detects the defects on the specimen in a defect review process). However, the one or more computer system(s) described herein do not need to be included in a system that includes an imaging system. For example, the computer system(s) described herein may acquire the high resolution image(s) for the selected location(s) from a high resolution imaging system that generated the image(s) or from a storage medium (such as that described further herein) in which the high resolution imaging system stored the high resolution image(s). In this manner, the computer system(s) may be part of a system that does not have or need to have specimen handling capability. As such, the computer system(s) may be configured to perform the steps described herein in a manner commonly referred to as "off-tool" in that the steps are not performed "on" an imaging tool.

The DL model may be a deep neural network with a set of weights determined based on the data used to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The multiple layers perform a number of algorithms or transformations. In general, the number of layers is not significant and is use case dependent. For practical purposes, a suitable range of layers is from 2 layers to a few tens of layers. Modern neural network projects typically work with a few thousand to a few million neural units and millions of connections. The goal of the neural network is to solve problems in the same way that the human brain would, although several neural networks are much more abstract.

The DL models described herein belong to a class of computing commonly referred to as machine learning (ML). ML can be generally defined as a type of artificial intelligence (AI) that provides computers with the ability to learn without being explicitly programmed. ML focuses on the development of computer programs that can teach themselves to grow and change when exposed to new data. In other words, ML can be defined as the subfield of computer science that "gives computers the ability to learn without being explicitly programmed." ML explores the study and construction of algorithms that can learn from and make predictions on data—such algorithms overcome following strictly static program instructions by making data driven predictions or decisions, through building a model from sample inputs.

The DL models described herein may be further configured as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)" Hand et al., MIT Press, 2001, 578 pages; which are incorporated by reference as if fully set forth herein. The embodiments described herein may be further configured as described in these references.

Generally speaking, "DL" (also known as deep structured learning, hierarchical learning or deep machine learning) is a branch of ML based on a set of algorithms that attempt to model high level abstractions in data. In a simple case, there may be two sets of neurons: ones that receive an input signal and ones that send an output signal. When the input layer receives an input, it passes on a modified version of the input to the next layer. In a DL based model, there are many layers between the input and output (and the layers are not made of neurons but it can help to think of it that way), allowing the algorithm to use multiple processing layers, composed of multiple linear and non-linear transformations.

In DL, an observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of DL is replacing handcrafted features with efficient algorithms for unsupervised or semi-supervised feature learning and hierarchical feature extraction.

In one embodiment, the DL model is configured as a generative adversarial network. In this manner, the image-to-image transformations described herein may be performed by a generative adversarial network (GAN). A "generative" model can be generally defined as a model that is probabilistic in nature. In other words, a "generative" model is not one that performs forward simulations or rule-based approaches and, as such, a model of the physics of the processes involved in generating an actual image or output (for which a simulated image is being generated) is not necessary. Instead, as described further herein, the generative model can be learned (in that its parameters can be learned) based on a suitable training set of data. The generative model may be configured to have a DL architecture, which may include multiple layers that perform a number of algorithms or transformations.

GANs have recently shown success in generating simulated realistic imagery. These networks have been generalized to allow pixel-to-pixel mapping in which input images are transformed into output images which are dramatically different from the input. These networks have numerous applications including scene rendering from primitives and colorization. The GAN framework trains two models alternatively. The generator is an encoder/decoder network that is trained to generate "fake" images that cannot be distinguished between "real" images by a discriminator network which is fed alternating fake and real images for classification. The discriminator network, in turn, is trained to correctly classify real and fake examples.

Figure 2:
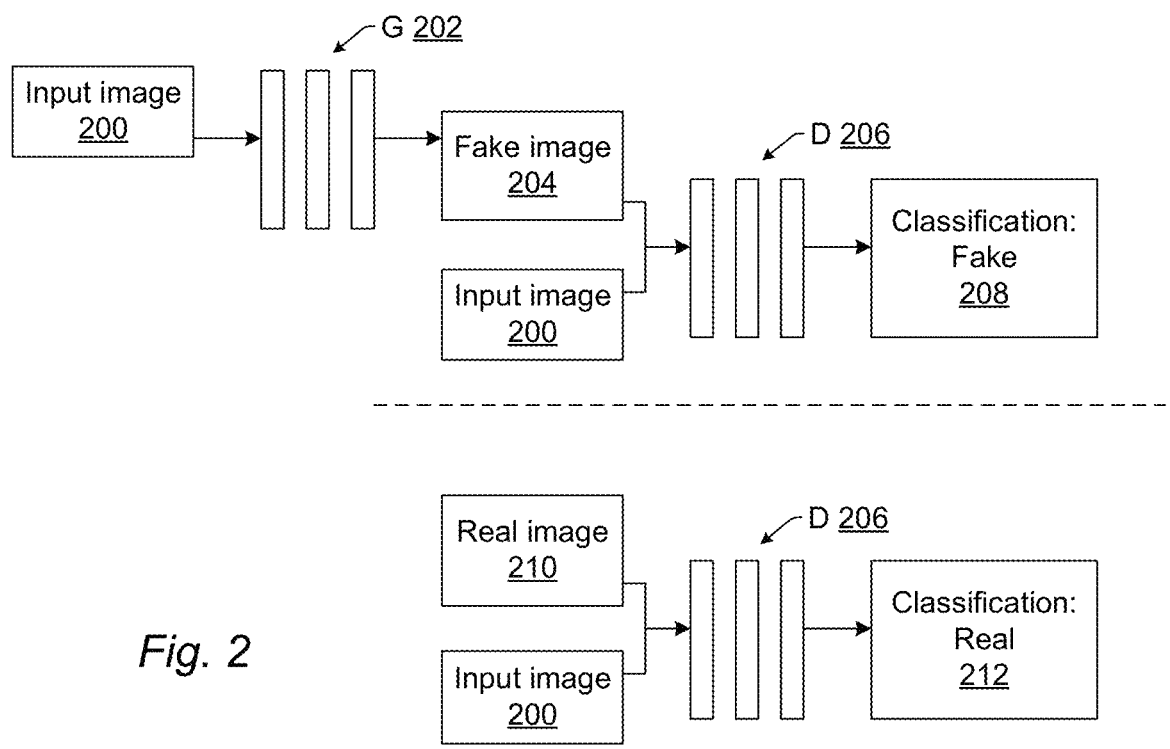
FIGS. 2 and 3 are block diagrams illustrating embodiments of a deep learning model that may be included in the systems described herein.

The two adversarial goals are illustrated in FIG. 2. In particular, FIG. 2 illustrates the training goals of the GAN generator (G) and discriminator (D) networks with input (x) and real imagery (y). For example, as shown in FIG. 2, input image 200 may be input to G 202, which may be configured as described further herein. In one such example, G may include a number of convolutional and other layers having any suitable configuration and arrangement. The output of G 202 is fake image 204, which is input to D 206 along with input image 200. D 206 may also include a number of convolutional and other layers having any suitable configuration and arrangement. In a similar manner, real image 210 may be input to D 206 along with input image 200. As such, different image tuples, (real, input) and (fake, input), may be input to the discriminator at different times. D then learns to classify between the real and fake images. For example, when the fake and input images are input to the discriminator, D learns to generate Classification: Fake 208 results. In addition, when the real and input images are input to the discriminator, D learns to generate Classification: Real results 212. The objective function is expressed in the below equation, where the GAN generator (G) tries to minimize this function with fake imagery (maximal discriminator uncertainty) and the discriminator (D) tries to maximize the function with both real and fake imagery (minimal uncertainty).

$$G^* = \mathrm{argmin}_G \max_D L_{GAN}(G,D) + \lambda L_{L1}(G), \text{ where}$$

$$L_{GAN}(G,D) = E_{x,y}[\log D(x,y)] + E_{x,z}[(1-D(x,G(x,z)))]$$

It should be noted that the inputs to the discriminator are conditioned on the input image, x, and z is a random variable. Finally, the generator is also taught to minimize the L1 distance between fake images and ground truth (e.g., SEM) images.

Figure 3:
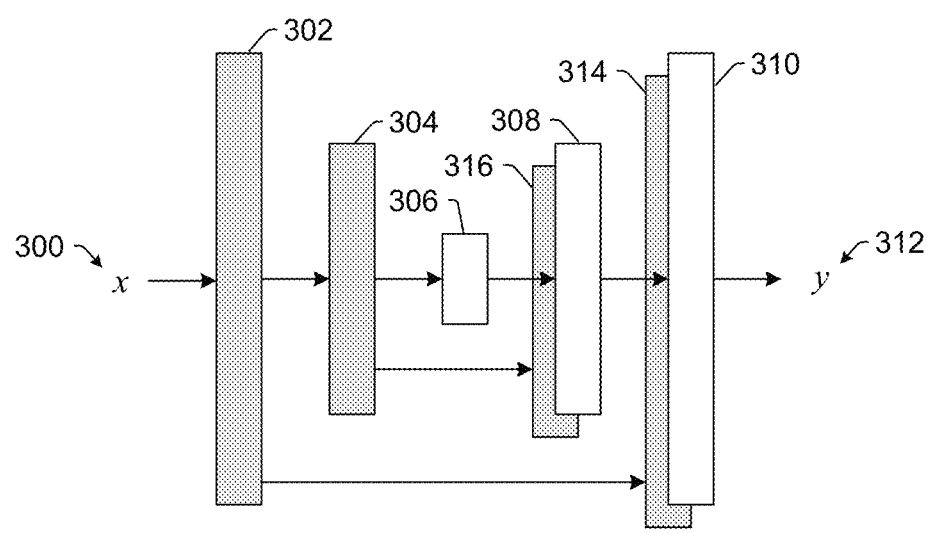

The discriminator network architecture may be a standard convolutional neural network classifier. The generator network may be a U-Net architecture using skip-connections intended to preserve detail in the output images by bypassing the encoder/decoder bottleneck. One embodiment of a U-Net architecture is shown in FIG. 3. As shown in FIG. 3, the U-Net architecture may include an encoder stack shown generically in FIG. 3 by layers 302 and 304 and a decoder stack shown generically in FIG. 3 by layers 308 and 310. Although the encoder and decoder stacks are shown in FIG. 3 as including 2 layers, the encoder and decoder stacks may include any suitable number of layers. Input image, x, 300 is input to layer 302 resulting in hidden representation 306 (also commonly referred to as the bottleneck layer) being generated by layer 304 or the last layer in the encoder stack. The hidden representation is input to layer 308 or the first layer of the decoder stack resulting in layer 310 or the last layer of the decoder stack generating output image, y, 312.

The skip connections in this configuration are what make the architecture a U-Net architecture. In particular, the architecture includes skip connections between mirrored layers in the encoder and decoder stacks. In FIG. 3, for example, there is a skip connection between layer 302 and its mirrored layer shown schematically in FIG. 3 as mirrored layer 314. In addition, there is a skip connection between layer 304 and its mirrored layer shown schematically in FIG. 3 as mirrored layer 316. The skip connections are configured to concatenate all channels at one encoder layer with those at the encoder layers mirrored in the decoder stack. In this manner, low-level information shared between the input and output can be shuttled directly across the net via the skip connections.

The DL models described herein may be further configured as described in "Generative Adversarial Nets," by Goodfellow et al., arXiv:1406.2661v1, Jun. 10, 2014, pp. 1-9 and "Image-to-Image Translation with Conditional Adversarial Networks," by Isola et al., arXiv:1611.07004v2, Nov. 22, 2017, 17 pages, which are incorporated by reference as if fully set forth herein. The embodiments described herein may be further configured as described in these references. Although in some embodiments described herein, the DL model is described as a GAN, the DL model is not limited to GANs and could be constructed using any suitable image-to-image transformation such as a standalone autoencoder or a traditional model-based approach (e.g., solving for a transformation function).

Figure 4:
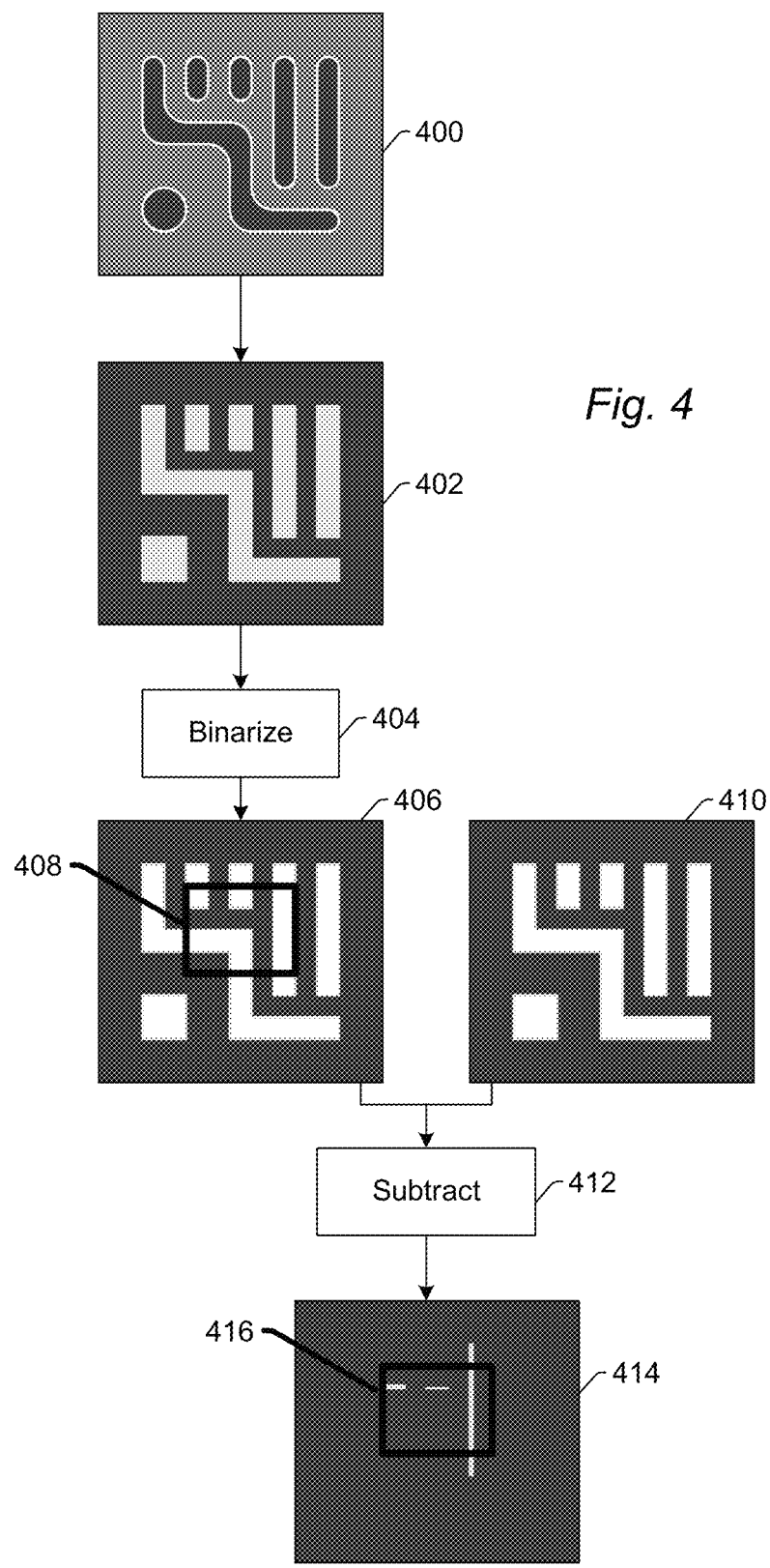
FIG. 4 is a flow chart illustrating steps that may be performed by the embodiments described herein.

The GANs described herein perform reverse functions. Usually, GANs render "fake," (i.e., simulated) high resolution, e.g., SEM, images from design input. The training is performed using design clips (binary or multi-gray level for multiple design layers) as the training data and high resolution images corresponding to the design clips as the labels (i.e., "ground truth") for the training data. The trained GANs then perform an inference using design clips as input to output GAN "fake" high resolution images. In contrast, in the embodiments described herein, the GAN may be a kind of "Reverse GAN" that renders "fake" design images from high resolution image inputs. The training of a Reverse GAN may be performed using reference high resolution images (e.g., defect free SEM images) as the training data with design clips corresponding to the reference high resolution images as the labels for the training data. In this manner, the Reverse GAN may be trained using a set of non-defective high resolution images and their corresponding design images as the ground truth labels. The Reverse GAN training may otherwise be performed as described further herein or in any other manner known in the art. The trained Reverse GAN may then perform an inference using high resolution images (e.g., defective high resolution images) as input to thereby output GAN "fake" design clips (e.g., GAN "fake" defective design clips). In this manner, once the Reverse GAN is trained for a specific process level, inference is performed by running the trained GAN on high resolution images generated at the locations described herein. The output of the Reverse GAN is a gray scale version of a rendered design image for the input high resolution image. For example, as shown in FIG. 4, high resolution image 400 may be input to a Reverse GAN (not shown in FIG. 4) to thereby generate gray scale simulated design data image 402.

In one embodiment, the DL model is configured to transfer artifacts of one or more defects in the high resolution image to the gray scale simulated design data image. For example, the DL model is not trained to try to make the high resolution image from the specimen look like a defect free design data image. Instead, although the DL model transfers the high resolution image from the specimen to a gray scale simulated design data image (e.g., by reducing rounding of corners in the high resolution image, by reducing relatively minor line edge roughness, etc.), the gray scale simulated design data image will deviate from the design data as initially created by a designer due to any defects on the specimen and present in the high resolution image. In this manner, the simulated database image generated from a high resolution specimen image (e.g., a defective SEM image) will contain the artifacts of the defect in the high resolution image (typically missing pattern or extra pattern in the design image). These artifacts can, in turn, be used to detect the defects, as described further herein, rather than the original SEM or other high resolution image. One advantage of these embodiments is therefore that the image complexity is greatly reduced (in the simulated design data image compared to the high resolution image) resulting in a much simpler defect detection algorithm (when the defect detection is performed using the simulated design data image instead of the high resolution image).

The one or more computer systems are configured for generating a simulated binary design data image for the location from the gray scale simulated design data image. For example, as shown in FIG. 4, the computer system(s) may perform binarize step 404 on gray scale simulated design data image 402 to thereby generate simulated binary design data image 406. Although one particularly suitable way for generating the simulated binary design data image is described further herein, the computer system(s) may generate the simulated binary design data image in any other suitable manner known in the art.

In one embodiment, generating the simulated binary design data image includes thresholding the gray scale simulated design data image to binarize the gray scale simulated design data image and match nominal dimensions of patterned features in the gray scale simulated design data image to nominal dimensions of patterned features in the design data for the specimen. For example, usually ground truth design images are binary or tri-level (depending on whether the design images are for only one layer on the specimen or two layers on the specimen), and the rendered gray scale design image generated by the DL model may have substantially large histogram peaks corresponding to the ground truth image values. To perform detection using the rendered design images generated by the DL model, the computer system(s) may threshold the rendered design images into the binary or tri-level values corresponding to the ground truth. In some such instances, the computer system(s) may generate a histogram of gray scale values in the gray scale simulated design data image and then apply a threshold to the histogram to thereby binarize the image. Threshold values are selected to match the pattern widths (or other dimensions) of features in the design. In this manner, the computer system(s) may threshold the simulated database image to binarize and match the nominal true design pattern width (or other dimensions) and then, as described further herein, subtract it from the true design pattern. In other words, to use the Reverse GAN image for defect detection, the computer system(s) may threshold the Reverse GAN generated design clip to match the high resolution image design rule (DR) width.

In another embodiment, the design data is for patterned features on only one level of the specimen. When the design data is for only one level of the specimen (e.g., one layer on a wafer or one layer on a reticle), the simulated binary design data image may include only binary values, one for patterns on the layer (for both intended patterns and any unintended patterns (i.e., defects or defective portions of patterns)) and the other for background or unpatterned areas of the layer. For example, as shown in FIG. 4, in simulated binary design data image 406, patterned features are shown with one binary value (as indicated by the white portions of the image) and unpatterned areas are shown with the other binary value (as indicated by the dark gray portions of the image). Whether the patterned features or the background are indicated by one binary value or the other makes no difference to the embodiments described herein.

In a further embodiment, the design data is for patterned features on different levels of the specimen, and the simulated binary design data image includes different gray levels for the patterned features on the different levels of the specimen. For example, some high resolution imaging tools may produce images that are responsive to patterned features on different levels of the specimen, one of which is formed under another of the levels. In some instances, imaging patterned features on different levels of the specimen may be advantageous. In other instances, it can be problematic (when patterned features on a level other than the one for which defects are being detected can affect the images in ways that make that defect detection more difficult). Regardless, the computer system(s) may generate the simulated binary design data image such that the patterned features on different levels of the specimen are indicated with different gray levels. In this manner, the simulated binary design data images described herein may be tri-level type images in which in addition to binary values, another gray level is used to differentiate between features that are formed on different levels of the specimen.

In such instances, the multi-gray levels may be assigned to the patterned features on different levels in the binarization step using information about the design for the specimen or the design data itself. For example, patterned features formed on different levels of the specimen may have one or more different characteristics such as different nominal (or as-designed) dimensions, different orientations, different shapes, different spatial relationships between the patterned features on the same level or different levels, etc. that can be used to differentiate between them. In this manner, using the gray scale simulated design data image and the design information or data, the computer system(s) can identify patterned features that are on different levels of the specimen and can assign different gray levels to them in the simulated binary design data image. Once the patterned features on different levels have been identified, that information can be used to identify the area of interest (or care area) on the level of the specimen for which the defects are being detected by the embodiments described herein.

The one or more computer systems are configured for detecting defects at the location on the specimen by subtracting design data for the location from the simulated binary design data image. In this manner, the defective Reverse GAN design image that has been binarized can be subtracted from the true design (or vice versa) for defect detection. For example, as shown in FIG. 4, the computer system(s) may be configured to perform subtract step 412 in which design data 410 is subtracted from simulated binary design data image 406. The results of the subtraction may include difference image 414 that illustrates any differences between the design data and the simulated binary design data image.

Detecting the defects may also include using the difference image to detect defects on the specimen. For example, the computer system(s) may apply a threshold to the difference image and any pixels in the difference image having a value above the threshold may be identified as defects or defect candidates. The difference images may be used in any other manner to detect defects on the specimen. For example, any defect detection method or algorithm that uses difference images to detect defects on specimens may be applied to the difference images generated by the embodiments described herein.

In addition or alternatively, the one or more computer systems may be configured for detecting the defects on the specimen in the simulated binary design data images by single image detection (SID). In this manner, detecting the defects may or may not include subtracting design data for the location from the simulated binary design data image. In particular, in SID, a reference image is not needed for defect detection. Instead, only potential defect location images (i.e., "test" images) are input to the SID method or system. SID may be performed by the embodiments described herein as described in U.S. Patent Application Publication No. 2017/0140524 published May 18, 2017 by Karsenti et al., which is incorporated by reference as if fully set forth herein. The embodiments described herein may be further configured as described in this publication.

The embodiments described herein perform defect detection in simulated design data (database) space instead of using the specimen-acquired, high resolution images themselves for defect detection. One advantage of such defect detection is that the complexity of the image space used for detection is reduced. As such, simpler detection and nuisance reduction algorithms can be applied. The defect detection described herein can also be used as an alternative to existing defect detection methods or can be used as an additional defect detection method to improve detectability and nuisance suppression. As an entirely new defect detection method, the embodiments described herein can be used to extend the entitlement and performance of existing inspection platforms. In addition, by extending the entitlement through algorithms (rather than hardware), the roadmap of existing inspection platforms can be extended.

In some embodiments, the design data subtracted from the simulated binary design data image is not generated by simulation of the specimen or the high resolution imaging system. For example, since the specimen information that is used for defect detection is a simulated image rendered in the design data space, the information that is subtracted from that image is also an image in the design data space. In this manner, unlike many inspection methods in which an image generated from a specimen is used for inspection thereby requiring a reference image in specimen space (e.g., an image from an adjacent area (e.g., die, cell, field, etc.) on the specimen or an image simulated from a design (e.g., based on simulated characteristics of the specimen and the high resolution imaging system) to render an image in specimen space), the embodiments described herein can use design data for the reference used in defect detection and do not have to acquire a reference image from another area on the specimen or alter the design data to create a reference image.

In one embodiment, detecting the defects includes restricting an area of interest in results of the subtracting to a care area in the simulated binary design data image and applying a detection area threshold to only the results of the subtracting in the restricted area of interest. For example, nuisance pixels in the difference image can be eliminated by restricting the area of interest to the care area and applying an area threshold within the care area. A defective pixel count exceeding an area threshold is flagged as a defect. In one such example, as shown in FIG. 4, area 408 in simulated binary design data image 406 may correspond to a care area for the specimen. The care area may be determined in any suitable manner and may have any suitable configuration. The placement or identification of the care area in the simulated binary design data image may be performed in any suitable manner using any of the images described herein (e.g., by aligning one or more of the images to the design data for the specimen and using information about the location of the care area in the design data to identify the care area in the one or more of the images aligned to the design data). Corresponding area 416 may be located in difference image 414 resulting from subtraction step 412 and the area of interest for defect detection may be restricted to this corresponding area. In this manner, the rendered GAN, binarized design image may be subtracted from the ground truth design image (or vice versa) and detection may be applied to the care area portion of the resulting difference image. As such, using a Reverse GAN for defect detection may include using an area based threshold for defect detection in inspection care area regions.

In some embodiments, the DL model is configured for, for an additional location known to be defect free on the specimen, generating an additional gray scale simulated design data image from an additional high resolution image generated at the additional location, and the one or more computer systems are configured for generating an additional simulated binary design data image for the additional location from the additional gray scale simulated design data image. The additional location may be known to be defect free in any suitable manner known in the art. For example, one or more locations at which defects were not detected in an inspection process performed on the specimen may be used as the one or more additional locations. In some instances, the one or more additional locations may be confirmed to be defect free prior to being used as the additional location(s). Such confirmation may be performed in any suitable manner such as acquiring high resolution images at the potential additional location(s) and displaying the images to a user for review and acceptance or rejection as additional location(s). Generating the additional gray scale simulated design data image may otherwise be performed as described further herein. In addition, generating the additional simulated binary design data image may be performed as described herein. If these steps are performed for more than one additional location, the steps may be performed separately and independently for each additional location. In some instances, if the steps are performed for more than one additional location on the specimen corresponding to the same within design position, the additional simulated binary design data images may be combined in some manner (e.g., by averaging, median, mean, etc.) to generate a composite additional simulated binary design data image that may then be used in additional ways described herein.

In one such embodiment, the design data subtracted from the simulated binary design data image for the detecting defects step includes the additional simulated binary design data image. For example, GAN-generated images can have several applications to assist with defect review or inspection including reference image generation for die-to-database type subtraction. In some currently used GAN applications, design clips are used as input to the GAN, and the GAN generates simulated high resolution images. However, in the embodiments described herein, the GAN is trained and used to perform the reverse function, i.e., the GAN generates simulated design data images from high resolution specimen image inputs. The additional simulated binary design data image(s) may be used in the detecting step as described further herein.

In another such embodiment, detecting the defects includes aligning the design data to the simulated binary design data image generated for the location using the additional simulated binary design data image. For example, GAN-generated images can have several applications to assist with defect review including alignment image generation. In some currently used GAN applications, design clips are used as input to the GAN, and the GAN generates fake high resolution images. However, in the embodiments described herein, the GAN is trained and used to perform the reverse function, i.e., the GAN generates simulated design data images from high resolution specimen image inputs. The additional simulated binary design data image may be aligned to the simulated binary design data image and/or the design data in any suitable manner known in the art (e.g., via pattern matching).

In an additional such embodiment, the one or more computer systems are configured for training a defect classifier using the additional simulated binary design data image. For example, GAN-generated images can have several applications to assist with defect review including training set augmentation for training high resolution image-based defect classifiers, which can be particularly important when substantially few training samples are available. In some currently used GAN applications, design clips are used as input to the GAN, and the GAN generates fake high resolution images. However, in the embodiments described herein, the GAN is trained and used to perform the reverse function, i.e., the GAN generates simulated design data images from high resolution specimen image inputs. In some instances, since the additional simulated binary design data image(s) are for known defect free location(s) on the specimen, the computer system(s) may be configured to augment the additional simulated binary design data image(s) with artificial defects for known DOIs and/or known nuisances to thereby create defective additional simulated binary design data image(s). Modifying the defect free images to include images of defects may be performed as described in U.S. Patent Application Publication Nos. 2019/0294923 published Sep. 26, 2019 by Riley et al. and 2019/0303717 published Oct. 3, 2019 by Bhaskar et al., which are incorporated by reference as if fully set forth herein. The embodiments described herein may be further configured as described in these publications. However, the additional simulated binary design data image(s) may also be used without augmentation as defect-free images for defect classifier training so that the defect classifier can be trained to differentiate defect containing images from defect-free images.

In some embodiments, the one or more computer systems are configured for training a defect classifier using one or more of the gray scale simulated design data image, the simulated binary design data image, the design data, and results of the subtracting. For example, it may be advantageous to train a defect classifier using a stack of images for a known defect location including any one or more of the images described herein for that defect location. In some such instances, the image(s) may be labeled with ground truth data (in this case a defect classification) by a user or using another trained defect classifier that may or may not be of the same type as the defect classifier that will be trained. For example, the defect classifier that is used to establish the defect classifications that are then used for training may be a non-ML type defect classifier, while the defect classifier that is trained using such data may be a ML type defect classifier. After the defect classifier has been trained using any one or more of the images described herein, those same one or more types of images may be input to the trained classifier at runtime. For example, if training is performed using the gray scale simulated design data image and the simulated binary design data image, then when the defect classifier is used for classification, the images input to the defect classifier may be gray scale simulated design data images and simulated binary design data images for detected defects.

The defect classifier that is trained as described above may include any suitable defect classifier known in the art. The defect classifier may be configured and trained as described in U.S. Patent Application Publication Nos. 2019/0073566 published Mar. 7, 2019 by Brauer and 2019/0073568 published Mar. 7, 2019 by He et al., which are incorporated by reference as if fully set forth herein. The embodiments described herein may be further configured as described in these publications.

In one embodiment, the one or more computer systems are configured to discover previously unknown defect types on the specimen using results of the detecting. For example, inspection results are typically reviewed using SEM or other high resolution images for defect classification. During defect discovery this is particularly important due to the unknown defectivity on the specimen. Defect discovery may include classifying the defects that cannot be classified by a trained classifier (meaning that the trained classifier is not able to classify the defects). Such classification may be performed using any one or more of the images described herein for a location of a defect that could not be classified and in any suitable manner known in the art.

The embodiments described herein may be further configured as described in commonly owned U.S. Patent Application Publication Nos. 2017/0140524 published May 18, 2017 by Karsenti et al., 2017/0148226 published May 25, 2017 by Zhang et al., 2017/0193400 published Jul. 6, 2017 by Bhaskar et al., 2017/0193680 published Jul. 6, 2017 by Zhang et al., 2017/0194126 published Jul. 6, 2017 by Bhaskar et al., 2017/0200260 published Jul. 13, 2017 by Bhaskar et al., 2017/0200264 published Jul. 13, 2017 by Park et al., 2017/0200265 published Jul. 13, 2017 by Bhaskar et al., 2017/0345140 published Nov. 30, 2017 by Zhang et al. 2019/0073566 published Mar. 7, 2019 by Brauer, and 2019/0073568 published Mar. 7, 2019 by He et al., which are incorporated by reference as if fully set forth herein. In addition, the embodiments described herein may be configured to perform any steps described in these publications.

All of the embodiments described herein may be configured for storing results of one or more steps of the embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. to perform one or more functions for the specimen or another specimen.

Such functions include, but are not limited to, altering a process such as a fabrication process or step that was or will be performed on the specimen in a feedback or feedforward manner, etc. For example, the computer system(s) may be configured to determine one or more changes to a process that was performed on the specimen and/or a process that will be performed on the specimen based on the detected defect(s). The changes to the process may include any suitable changes to one or more parameters of the process. The computer system(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer system(s) may determine such changes in any suitable manner known in the art.

Those changes can then be sent to semiconductor fabrication system 108 shown in FIG. 1 or a storage medium (not shown in FIG. 1) accessible to both the computer system(s) and the semiconductor fabrication system. The semiconductor fabrication system may or may not be part of the system embodiments described herein. For example, the high resolution imaging system and the computer system(s) described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of each of the systems described above may be combined together into one single embodiment.

Another embodiment relates to a computer-implemented method for detecting defects on a specimen. The method includes, for a location on a specimen, generating a gray scale simulated design data image from a high resolution image generated at the location. The high resolution image is generated at the location by a high resolution imaging system. Generating the gray scale simulated design data image is performed by a DL model included in one or more components executed by one or more computer systems, all of which may be configured as described further herein. The method also includes generating a simulated binary design data image for the location from the gray scale simulated design data image. In addition, the method includes detecting defects at the location on the specimen by subtracting design data for the location from the simulated binary design data image. Generating the simulated binary design data image and detecting the defects are performed by the one or more computer systems.

Each of the steps of the method may be performed as described further herein. The method may also include any other step(s) that can be performed by the system, computer system(s), component(s), and/or DL model described herein. In addition, the method described above may be performed by any of the system embodiments described herein.

Figure 5:
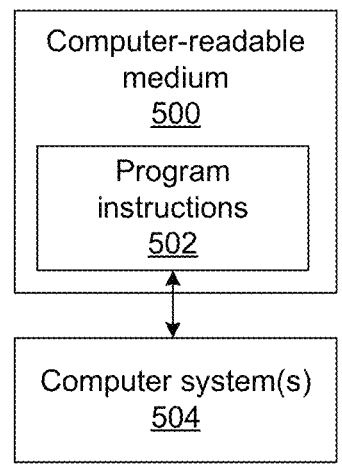
FIG. 5 is a block diagram illustrating one embodiment of a non-transitory computer-readable medium storing program instructions for causing computer system(s) to perform a computer-implemented method described herein.

An additional embodiment relates to a non-transitory computer-readable medium storing program instructions executable on one or more computer systems for performing a computer-implemented method for detecting defects on a specimen. One such embodiment is shown in FIG. 5. In particular, as shown in FIG. 5, non-transitory computer-readable medium 500 includes program instructions 502 executable on computer system(s) 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 504 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a specimen, comprising:
    one or more computer systems; and
    one or more components executed by the one or more computer systems, wherein the one or more components comprise a deep learning model configured for generating a gray scale simulated design data image for a location on a specimen from a high resolution image generated at the location, and wherein the high resolution image is generated at the location by a high resolution imaging system;
    wherein the one or more computer systems are configured for generating a simulated binary design data image for the location from the gray scale simulated design data image; and
    wherein the one or more computer systems are further configured for detecting defects at the location on the specimen by subtracting design data for the location from the simulated binary design data image.

2. The system of claim 1, wherein the deep learning model is further configured as a generative adversarial network.

3. The system of claim 1, wherein the deep learning model is further configured to transfer artifacts of one or more defects in the high resolution image to the gray scale simulated design data image.

4. The system of claim 1, wherein generating the simulated binary design data image comprises thresholding the gray scale simulated design data image to binarize the gray scale simulated design data image and match nominal dimensions of patterned features in the gray scale simulated design data image to nominal dimensions of patterned features in the design data for the specimen.

5. The system of claim 1, wherein said detecting comprises restricting an area of interest in results of said subtracting to a care area in the simulated binary design data image and applying a detection area threshold to only the results of said subtracting in the restricted area of interest.

6. The system of claim 1, wherein the deep learning model is further configured for generating an additional gray scale simulated design data image for an additional location known to be defect free on the specimen from an additional high resolution image generated at the additional location, wherein the one or more computer systems are further configured for generating an additional simulated binary design data image for the additional location from the additional gray scale simulated design data image, and wherein the design data subtracted from the simulated binary design data image for the detecting comprises the additional simulated binary design data image.

7. The system of claim 1, wherein the deep learning model is further configured for generating an additional gray scale simulated design data image for an additional location known to be defect free on the specimen from an additional high resolution image generated at the additional location, wherein the one or more computer systems are further configured for generating an additional simulated binary design data image for the additional location from the additional gray scale simulated design data image, and wherein said detecting comprises aligning the design data to the simulated binary design data image generated for the location using the additional simulated binary design data image.

8. The system of claim 1, wherein the deep learning model is further configured for generating an additional gray scale simulated design data image for an additional location known to be defect free on the specimen from an additional high resolution image generated at the additional location, wherein the one or more computer systems are further configured for generating an additional simulated binary design data image for the additional location from the additional gray scale simulated design data image, and wherein the one or more computer systems are further configured for training a defect classifier using the additional simulated binary design data image.

9. The system of claim 1, wherein the one or more computer systems are further configured for training a defect classifier using results of said subtracting.

10. The system of claim 1, wherein the one or more computer systems are further configured for training a defect classifier using one or more of the gray scale simulated design data image, the simulated binary design data image, the design data, and results of said subtracting.

11. The system of claim 1, wherein the one or more computer systems are further configured to discover previously unknown defect types on the specimen using results of said detecting.

12. The system of claim 1, wherein the design data subtracted from the simulated binary design data image is not generated by simulation of the specimen or the high resolution imaging system.

13. The system of claim 1, wherein the design data subtracted from the simulated binary design data image and the simulated binary design data image illustrate optical proximity correction features in the design data.

14. The system of claim 1, wherein the design data subtracted from the simulated binary design data image and the simulated binary design data image do not illustrate optical proximity correction features in the design data.

15. The system of claim 1, wherein the location is selected from locations on the specimen at which one or more defects were previously detected, and wherein the one or more defects were detected at the locations on the specimen by a light-based inspection system.

16. The system of claim 1, wherein the location is selected from locations on the specimen at which one or more defects were previously detected, and wherein the one or more defects were detected at the locations on the specimen by the high resolution imaging system.

17. The system of claim 1, wherein the high resolution imaging system is configured as an electron beam imaging system.

18. The system of claim 1, wherein the system comprises the high resolution imaging system.

19. The system of claim 1, wherein the design data is for patterned features on only one level of the specimen.

20. The system of claim 1, wherein the design data is for patterned features on different levels of the specimen, and wherein the simulated binary design data image comprises different gray levels for the patterned features on the different levels of the specimen.

21. A non-transitory computer-readable medium, storing program instructions executable on one or more computer systems for performing a computer-implemented method for detecting defects on a specimen, wherein the computer-implemented method comprises:

for a location on a specimen, generating a gray scale simulated design data image from a high resolution image generated at the location, wherein the high resolution image is generated at the location by a high resolution imaging system, and wherein generating the gray scale simulated design data image is performed by a deep learning model included in one or more components executed by the one or more computer systems;

generating a simulated binary design data image for the location from the gray scale simulated design data image; and detecting defects at the location on the specimen by subtracting design data for the location from the simulated binary design data image, wherein generating the simulated binary design data image and detecting the defects are performed by the one or more computer systems.

22. A computer-implemented method for detecting defects on a specimen, comprising:

for a location on a specimen, generating a gray scale simulated design data image from a high resolution image generated at the location, wherein the high resolution image is generated at the location by a high resolution imaging system, and wherein generating the gray scale simulated design data image is performed by a deep learning model included in one or more components executed by one or more computer systems;

generating a simulated binary design data image for the location from the gray scale simulated design data image; and detecting defects at the location on the specimen by subtracting design data for the location from the simulated binary design data image, wherein generating the simulated binary design data image and detecting the defects are performed by the one or more computer systems.

* * * * *